United States Patent Office 2,854,288
Patented Sept. 30, 1958

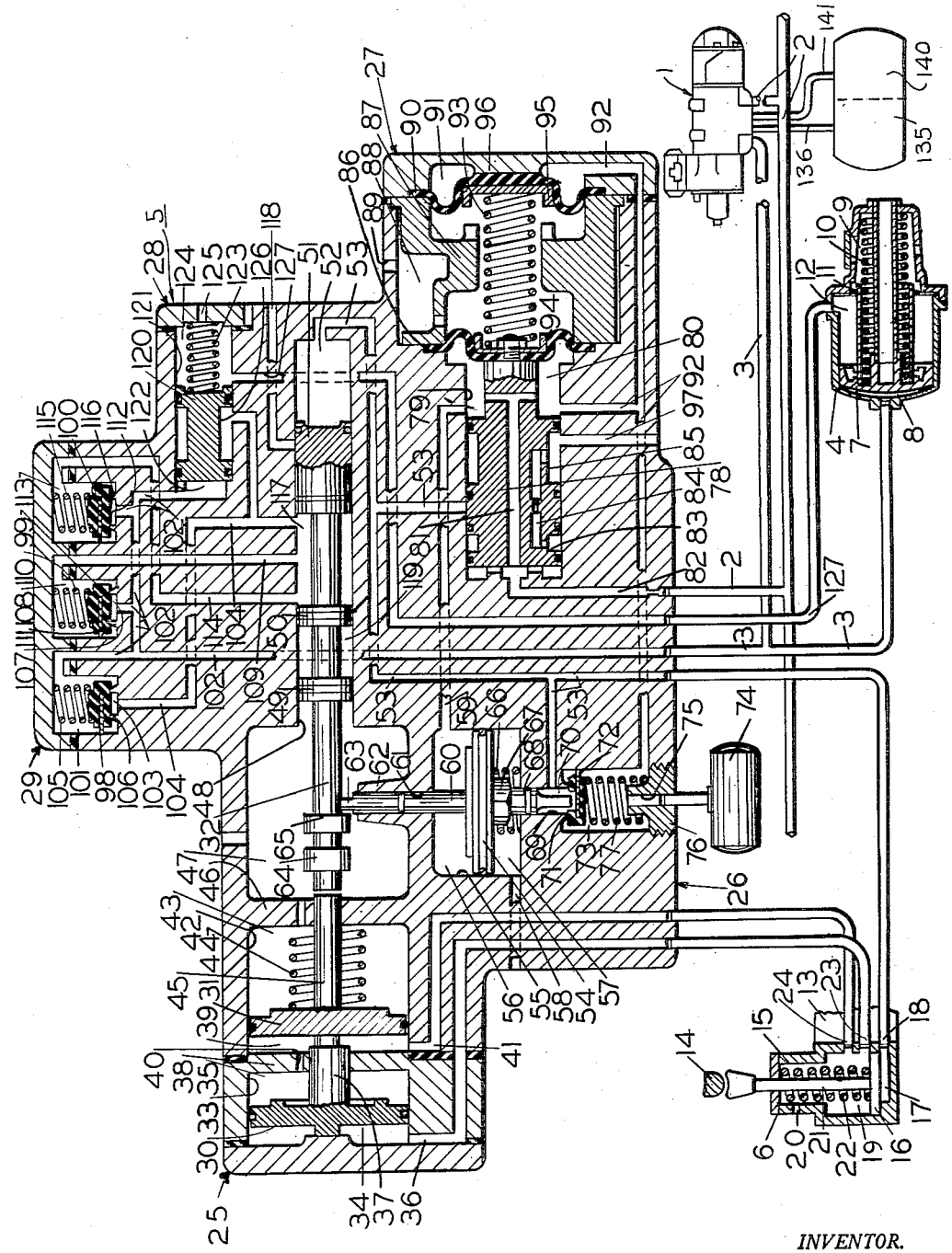

2,854,288
VARIABLE LOAD BRAKE APPARATUS

Glenn M. Thomas, Irwin, Pa., assignor to Westinghouse Air Brake Company, Wilmerding, Pa., a corporation of Pennsylvania Application March 29, 1954, Serial No. 419,211

2 Claims. (Cl. 303—22)

This invention relates to variable load brake apparatus for railway vehicles and more particularly to the type which automatically varies the braking force on such vehicles in accordance with the load carried thereby.

The principal object of this invention is to provide an improved variable load brake apparatus adapted for use with a load compensating brake cylinder device of the type disclosed in United States Patent No. 2,450,464 to A. J. Bent. This brake cylinder device comprises, briefly, a movable abutment subject on one side to pressure of fluid in a main chamber acting on its full area and subject on the opposite side to a load controlled fluid pressure in a compensating chamber acting on a substantially smaller area of said movable abutment.

Another object is to maintain the compensating chamber of a brake cylinder device of the above type open to atmosphere until the slack is taken up in the brake rigging.

Still another object is to open the compensating chamber to atmosphere during the final phase of brake release for assuring movement of the movable abutment to release position.

Other objects and advantages will become apparent from the following description and from the accompanying drawing, wherein the single figure is a diagrammatic view of a portion of a variable load brake apparatus embodying the invention.

DESCRIPTION

As shown in the drawing, the improved brake apparatus comprises the usual brake controlling valve device 1 comprising valve means (not shown) operative upon a service or an emergency reduction in pressure in a brake pipe 2 to supply fluid under pressure supplied from a service reservoir 135 and an emergency reservoir 140 to a brake cylinder device 4 via a pipe 3 for effecting, respectively, a service or an emergency application of the brakes and to, at the same time, supply fluid under pressure via a branch of said pipe 3 to a load compensating valve device 5 which is adapted to adjust the braking force according to the load carried by the vehicle, as measured by a strut device 6.

The brake cylinder device 4 may comprise a sectionalized casing containing a piston 7, at one side of which is the usual main chamber 8 to which fluid under pressure is adapted to be supplied by way of pipe 3 for causing said piston 7 to move outwardly for applying the brakes. Upon release of fluid under pressure from chamber 8, a return spring 9 arranged in an atmospheric chamber 10 is adapted to move piston 7 inwardly to a brake release position. A sleeve 11 encircling return spring 9 is attached at one end to piston 7 and slidably mounted adjacent its opposite end in the casing. The outer peripheral surface of sleeve 11 cooperates with piston 7 and the casing in defining a load compensating chamber 12 provided for the purpose of receiving fluid at a load controlled pressure to oppose the action of fluid under pressure in chamber 8 acting on the piston 7.

According to the invention and as will be described subsequently, means are provided whereby the compensating chamber 12 of the brake cylinder device 4 is maintained open to atmosphere until the pressure of fluid in the main chamber 8 has increased sufficiently to cause operation of piston 7 for rapidly taking up slack in the brake rigging (not shown), after which a fluid pressure differential controlled according to load conditions of the vehicle will be maintained between the pressures in chambers 8, 12.

The strut device 6 is adapted to be carried by a sprung portion 13 of the vehicle which extends beneath an unsprung portion 14 of said vehicle such that the vertical distance between said portions will vary according to the degree of load carried by said vehicle; such vertical distance being shown in the drawing at a minimum corresponding to an empty condition of said vehicle.

The strut device 6 may comprise a hollow, sectionalized casing 15 in which is slidably mounted a piston 16, at one side of which is a pressure chamber 17 continuously open to a casing port 18 and at the opposite side of which is an atmospheric chamber 19 continuously open to atmosphere via a vent port 20 in said casing. A rod 21, coaxially secured to the piston 16, extends vertically upward through chamber 19 and projects exteriorly of the casing 15, normally terminating below and out of contact with the unsprung portion 14. A spring 22 disposed in chamber 19 urges piston 16 to a normal position in which it is shown in the drawing.

When fluid under pressure is supplied to chamber 17 of strut device 6 via port 18, in the manner hereinafter to be described, the piston 16 is adapted to move upwardly against opposition of spring 22 and carry the projecting end of rod 21 into contact with the unsprung portion 14; the extent of travel of said piston being directly proportional to the vehicle load. During maximum travel, such as will occur when the vehicle is fully loaded, the piston 16 is adapted to successively uncover casing ports 23, 24 to the chamber 17; but during minimum travel, when the vehicle is empty, said piston will not uncover either of the ports 23, 24 to chamber 17 and said ports will therefore remain open to atmospheric chamber 19. When the vehicle is partially loaded, however, the piston 16 is adapted to travel sufficiently to uncover casing port 23, but not casing port 24, to the chamber 17.

The load compensating valve device 5 comprises a sectionalized casing containing a load adjustable control device 25; a locking device 26 for locking control device 25 in any one of three positions, hereinafter to be described; a cut-off valve device 27 for controlling operation of devices 25 and 26; an atmospheric valve device 28 for maintaining the compensating chamber 12 of brake cylinder device 4 open to atmosphere until fluid pressure in the main chamber 8 has attained a chosen value sufficient to assure take-up of slack in the brake rigging; and a fluid pressure control device 29 which cooperates with device 25 during a brake application to control the fluid pressure to compensating chamber 12 according to whether the vehicle is empty, partially loaded or fully loaded.

The load adjustable control device 25 comprises a movable abutment, preferably a partial load piston 30, coaxially arranged with and having the same effective area as another movable abutment, preferably a full load piston 31, which pistons 30 and 31 are adapted to control positioning of a load rod 32 in accordance with the weight carried by the vehicle, in the manner hereinafter to be described.

The piston 30, slidably mounted in a bore 33 in the casing, is subject opposingly to pressures of fluid in a pressure chamber 34 and a pressure chamber 35. Chamber 34 is adapted to be supplied with fluid under pressure by way of a conduit 36, which is constantly open to port 23 of strut device 6. A rod 37, coaxially secured to piston 30, extends through chamber 35 and has slidably guided engagement with the wall of a suitable bore in a casing partition 38 and projects through said partition into a pressure chamber 39. The chambers 35 and 39 are constantly open to each other via a port 40 through said casing partition 38, and the chamber 39, and hence chamber 35, are supplied with fluid under pressure by way of a conduit 41 constantly open to port 24 of strut device 6.

The piston 31, which is slidably mounted in a bore 42 in the casing, separates the pressure chamber 39 from an atmospheric chamber 43. A spring 44 disposed in chamber 43 normally urges the piston 31 into abutting contact with the projecting end of rod 37, such that when the chambers 34 and 39 are devoid of fluid under pressure, the pistons 30 and 31 will assume respective rest positions, in which they are shown in the drawing. A rod 45, coaxially secured to piston 31, extends through chamber 43 and has slidable contact with the wall of a bore through a casing partition 46 and projects exteriorly thereof into an atmospheric chamber 47.

The casing is provided with a bore 48 which extends inwardly from chamber 47 in coaxial alignment with and in the opposite direction from said chamber and the piston rod 45. The load rod 32, which at its one end is adapted to be abuttingly engaged by the projecting end of rod 45, has intermediate its ends two spaced apart collars 49, 50, suitably secured to said load rod and having sealing, slidably guided engagement with the wall of bore 48; said load rod 32 at its opposite end, i. e., inner end, being coaxially attached to one side of an "empty" piston 51 also having sealing, slidable engagement with the wall of bore 48 and of substantially smaller diameter than the pistons 30, 31. At the opposite side of piston 51 is a pressure chamber 52 which is constantly open via a conduit 53 and port 18 of strut device 6 to chamber 17 of the latter device.

The locking device 26 comprises a movable abutment, such as a piston 54, having sealing, slidable engagement with the wall of a casing bore 55, and separating a pressure chamber 56 from a chamber 57 constantly open to atmosphere via a casing passage 58. The pressure of fluid in chamber 56 is adapted to be controlled by way of a passage 59 in the casing. The piston 54 has a coaxially attached stem 60 which extends through chamber 56 and has sealing, slidably guided engagement with the wall of a bore 61 through a reinforced casing partition 62, and projects exteriorly of said casing partition into the chamber 47. At its projecting end, the stem 60 has an integrally formed dog 63 which in an upper or locking position, in which it is shown, is adapted to lock the load rod 32 in one of three axial positions (hereinafter to be described) by being engaged selectively by lateral surfaces of spaced apart collars 64, 65 encircling and suitably secured to said load rod 32. A spring 66 disposed in chamber 57 acts on piston 54 for urging dog 63 into locking position. To the side of piston 54 facing atmospheric chamber 57, there is coaxially secured, by means of a lock nut 67, a substantially cylindrical valve actuating rod 68 comprising a large diameter portion, which is adjacent said lock nut and has sealing, slidably guided engagement with the wall of a coaxially arranged bore 69 formed in the casing and extending from chamber 57 to a chamber 70, the latter chamber being constantly open to a branch of conduit 53 and defined in part by a small diameter portion of said rod and a lower portion of the wall of bore 69. An annular valve seat rib 71, formed by a downwardly projecting part of the casing encircling the lower end of bore 69, is adapted to provide seating engagement of a preferably disc-shaped check valve 72 which controls fluid pressure communication between chamber 70 and a pressure chamber 73. Chamber 73 is constantly open to a volume reservoir 74 by way of a central passage 75 through a cap nut 76 having screw-threaded engagement with a threaded opening in the casing for enclosing the lower end of said chamber.

A spring 77 disposed in chamber 73 normally maintains the check valve 72 in engagement with rib 71; but upon supply of fluid under pressure to chamber 56, the piston 54 is adapted to move downwardly for not only disengaging the dog 63 from one of the collars 64, 65, but also causing the rod 68 to unseat the check valve 72, against resistance of spring 77 so that fluid under pressure may flow from the volume reservoir 74 via passage 75, the chambers 73, 70 to conduit 53 and thence to the chamber 17 of the strut device 6 and chamber 52 adjacent piston 51 of device 25, for reasons hereinafter to be explained.

The cut-off device 27 is provided for controlling supply of fluid under pressure from the brake pipe 2 to the locking device 26. The cut-off valve device 27 comprises a substantially cylindrical slide valve 78 slidably mounted in a casing bore 79, one end of which defines, in part, a chamber 80 constantly open to a branch of the brake pipe 2 via a longitudinal passage 81 in slide valve 78 and a restricted passage 82 in the casing. The slide valve 78 has an annular groove 83 which is always open to a longitudinal, restricted passage 84 which is always open to an elongated annular groove 85. Coaxially connected to the end of slide valve 78 adjacent chamber 80 is a flexible diaphragm 86 clamped about its periphery between a casing portion and a stop element 87 and subject on one face to fluid pressure in chamber 80 and on the opposite face to atmospheric pressure in a chamber 88 defined in part by said stop element 87 and constantly open to atmosphere by way of a casing port 89. Arranged coaxially with, and of larger effective area than, the flexible diaphragm 86 is a flexible diaphragm 90 which is clamped about its periphery between a casing portion and stop element 87 and is subject at one side to atmospheric pressure in chamber 88 and at the opposite side to pressure of fluid in a pressure chamber 91. Chamber 91 is in contant communication with chamber 73 of locking device 26 via a passage 92, one branch of which opens through the wall of bore 79 and is adapted to be uncovered by slide valve 78 to chamber 80 under certain conditions hereinafter to be described.

A spring 93 disposed in chamber 88 acts on the usual diaphragm followers 94, 95 of the diaphragms 86, 90, respectively, for normally urging said diaphragms to the respective positions in which they are shown in the drawing, and in which the slide valve 78 abuts the base of bore 79 and the diaphragm 90 abuts a stop 96 formed integrally with the casing portion adjacent chamber 91. With the slide valve 78 in such position, hereinafter referred to as the "cut-in" position, the annular groove 85 is in registry with a vent port 97 in the casing, and hence grooves 83, 85 and restricted passage 84 are opened to atmosphere; and the passage 59 and the aforementioned branch of passage 92 are uncovered to chamber 80. The slide valve 78 is adapted to assume a "cut-off" position under another condition to be hereinafter described. In such position, the groove 83 will be in registry with a branch of the conduit 53, and groove 85 will effect registry of the vent port 97 with both the passage 59 and the aforementioned branch of passage 92 for respectively releasing fluid under pressure from chamber 52 of load device 25 at a rate controlled by the restricted passage 84, and at the same time releasing fluid under pressure at an unrestricted rate from chamber 56 of locking device 26 and also from chamber 91 and the volume reservoir 74.

The fluid pressure control device 28 comprises three check valves: a release check valve 98, a partial load check valve 99, and an empty check valve 100.

The release check valve 98 is subject, at one side, to the pressure of fluid in a chamber 101 constantly open via a passage 102 to a branch of pipe 3, and is subject at the opposite side to pressure of fluid in a chamber 103, as controlled via a passage 104 which opens through the wall of bore 48 in load device 25. A spring 105 disposed in chamber 101 urges the check valve 98 into engagement with an annular seat rib 106 encircling the passage 104.

The partial load check valve 99 controls communication between a chamber 107, constantly open to a branch of passage 102, and a chamber 108, the pressure in which is controlled by way of a casing passage 109 which also opens through the wall of bore 48 in load device 25. A spring 110 disposed in chamber 108 urges the check valve 99 into engagement with an annular projecting seat rib 111 encircling the aforesaid branch of passage 102.

The empty check valve 100 controls communication between a chamber 112, open to another branch of passage 102, and a chamber 113, the pressure in which is controlled by way of a casing passage 114 which also opens through the wall of bore 48 in load device 25. A spring 115 disposed in chamber 113 urges check valve 100 into engagement with an annular valve seat rib 116 encircling the aforesaid other branch of passage 102.

It is to be noted that the passages 104, 109 and 114 open through the wall of bore 48 at certain axially spaced apart distances such that when the rod 32 is in an empty position, in which it is shown in the drawing, an annular chamber 117, defined between the adjacent lateral surfaces of the collar 50 and the empty piston 51, will establish fluid pressure intercommunication between all three of the aforementioned passages. And in such empty position of rod 32, a passage 118, open to atmosphere and interseating the wall of bore 48, will be sealed off by the outer peripheral surface of the piston 51. When the load rod 32 is in a partial load position, in which the dog 63 of stem 60 of locking device 26 is disposed between the collars 64 and 65, the annular chamber 117 will establish fluid pressure communication between the passages 109 and 104, but passage 114 will be uncovered by the collar 50 to an annular chamber 119 between the collars 49 and 50. When the load rod 32 is in a full load position, in which the dog 63 of stem 60 of device 26 is disposed adjacent the left hand radial surface of collar 64, as viewed in the drawing, the passage 114 will be uncovered to passage 109 by the annular chamber 119 and passage 104 will be opened to atmosphere by way of the annular chamber 117 and vent passage 118.

According to one feature of the invention, the spring 115 is of such weight as to maintain the empty check valve 100 seated until the pressure in pipe 3, and hence in the main pressure chamber 8 of brake cylinder device 4, attains a certain preselected value, such as 5 p. s. i., sufficient to cause operation of the piston 7 for rapidly taking up slack in the brake rigging; whereas the spring 110 is stronger than spring 115 for maintaining the partial load check valve 99 seated until the pressure in the main chamber 8 has attained a certain preselected higher value, such as 15 p. s. i., when the vehicle is partially loaded, for reasons to be explained subsequently.

According to another feature of the invention, the atmospheric valve device 28 comprises a spool valve 120 having sealing, slidable engagement with the wall of a bore 121 in the casing. The spool valve 120 is subject on one end to the pressure of fluid in a chamber 122, which pressure is controlled by way of a branch of passage 102; and said spool valve is subject at the opposite end to action of a spring 123 disposed in an atmospheric chamber 124 open to atmosphere via a vent passage 125 in the casing. When the chamber 122 is substantially devoid of fluid under pressure, the spool valve 120 will assume a normal position, in which it is shown in the drawing, under the action of spring 123. In such position, an elongated annular groove 126 formed in the outer periphery of spool valve 120 intermediate its ends will be uncovered to a branch of passage 104. When fluid under pressure is supplied to chamber 122, the spool valve 120 will move, against opposition of spring 123, to a charging position in which the groove 126 will uncover the aforementioned branch of passage 104 to a conduit 127 which is constantly open to the compensating chamber 12 of brake cylinder device 4. It is to be noted that the spring 123 is of such weight as to insure that the compensating chamber 12 of brake cylinder device 4 will be vented to atmosphere, by way of conduit 127, atmospheric chamber 124 and vent passage 125, until a sufficient pressure, such as 5 p. s. i., is obtained in the main chamber 8 of brake cylinder device 4 to cause movement of piston 7 for rapid take-up of slack in the brake rigging. It should also be noted that the springs 115, 123 of devices 28, 29, respectively, are preferably of such relative effects as to assure that the empty check valve 100 will be unseated at substantially the same fluid pressure in pipe 3 at which the spool valve 120 will move to charging position so that, upon such movement of said spool valve, fluid pressures in the chambers 8, 12 of brake cylinder device 4 will build up such as to maintain a constant fluid pressure differential between said chambers, which differential is sufficient to assure that during a light service application of brakes on an empty vehicle the piston 7 will not be moved toward release position by fluid under pressure supplied to chamber 12. Moreover, the check valve 100 assures that there will be no temporary reduction in braking force, such as might otherwise occur if without said check valve main chamber pressure is permitted to equalize into the compensating chamber 12.

OPERATION

Initial charging of the apparatus

Assume initially that a railway vehicle equipped with the improved apparatus is empty and separated from a train; and that the brake pipe 2 of the vehicle is devoid of fluid under pressure. Under this condition, the brakes on the vehicle will be released, and the various parts of the brake cylinder device 4, the load compensating valve device 5, and the strut device 6 will be in the respective positions in which they are shown in the drawing.

If the empty vehicle is now coupled to a train, the brake pipe 2 will of course be connected at each end of the vehicle to the brake pipe sections on the adjacent vehicles of the train and, as a result, the brake apparatus will be in condition to be charged with fluid under pressure. In initially charging the apparatus, fluid under pressure supplied in the usual manner to the brake pipe 2 will flow via one branch thereof to the brake controlling valve device 1, whence it will flow through pipes 136 and 141 to reservoirs 135 and 140, respectively, in the usual manner, and some of such fluid will also flow via another branch of said brake pipe to the load compensating valve device 5 at a rate controlled by the restricted passage 82.

Fluid under pressure thus supplied to passage 82 will flow through passage 81 in slide valve 78 of cut-off device 27 to chamber 80, whence it will flow, with slide valve 78 in cut-in position in which it is shown, via passage 92 to chamber 91. When the pressure of fluid in chamber 91 acting on the larger diaphragm 90 has increased sufficiently to overcome the combined opposing effects of the same pressure in chamber 80 acting on the smaller diaphragm 86 and the action of spring 93, the diaphragm 90 will move in a left-hand direction, as viewed in the drawing, until follower 95 contacts stop element 87, for thereby increasing the pressure of said spring on the diaphragm 86, in order to assure that slide valve 78 will be maintained in cut-in position until brake pipe pressure is increased to a chosen value, hereinafter to be described.

With the slide valve 78 in cut-in position, fluid under pressure will flow via chamber 80 and passage 92 to chamber 73 of the locking device 26 and thence through passage 75 to the volume reservoir 74 for charging said reservoir; and, at the same time, fluid under pressure will also flow via chamber 80 and passage 59 to chamber 56 in the locking device 26.

When the pressure of fluid in chamber 56 acting on piston 54 becomes great enough to overcome the opposing force of spring 66, piston 54 will move downwardly, as viewed in the drawing, for not only carrying the dog 63 of stem 60 out of locking relation with collar 65 but also, at the same time, causing the rod 68 to unseat check valve 72 against opposition of spring 77. With the check valve 72 unseated, fluid under pressure will flow from the volume reservoir 74, through passage 75, chamber 73, past unseated check valve 72 into chamber 70 and thence, via respective branches of conduit 53 to chamber 17 of strut device 6 and also to chamber 52 of device 28.

When the pressure of fluid in chamber 17 acting on piston 16 overcomes the opposing force of spring 22, said piston 16 will be moved upwardly its minimum travel, as hereinbefore described for an empty vehicle, such that ports 23 and 24 will remain open to atmosphere via chamber 19 and vent port 20, with the result that piston chambers 34, 39, 35, respectively, in the load compensating device 25 will remain open to atmosphere via atmospheric chamber 19, and the spring 44 acting on piston 31 will thus maintain the pistons 31 and 30 in their respective normal positions, in which they are shown in the drawing.

Since the pressure chambers 34, 39 of the pistons 30, 31 are thus devoid of fluid under pressure, the pressure of fluid in chamber 52 of load adjusting device 25 acting on empty piston valve 51 will cause virtually unopposed movement of rod 32 in a left-hand direction, as viewed in the drawing, until the left end of said rod engages the projecting end of piston rod 45. Under such condition, the rod 32 will be disposed in empty position, in which the annular space 117 will establish fluid pressure intercommunication between the passages 104, 109 and 114, for reasons which will be explained subsequently.

When the pressure of fluid in the brake pipe 2 has attained a certain chosen value, such as 35 p. s. i., fluid pressure in chamber 80 of the cut-off device 27 acting on diaphragm 86 will have increased sufficiently to urge said diaphragm, and hence the slide valve 78, in a right-hand direction, as viewed in the drawing, until the diaphragm follower 94 contacts stop 87, at which time slide valve 78 will be in its cut-off position.

With the slide valve 78 in cut-off position, fluid under pressure in the volume reservoir 74 and in chamber 91 will be vented to atmosphere via passage 92, the annular groove 85 in said slide valve, and vent passage 97. It will be noted that during this venting of fluid under pressure from chamber 91 the spring 93 will deflect diaphragm 90 in a right-hand direction against stop 96, and that so long as brake pipe pressure exceeds the exemplary 35 p. s. i., the pressure of fluid in chamber 80 acting on diaphragm 86 will be effective to maintain slide valve 78 in cut-off position, and, with slide valve 78 in cut-off position, fluid under pressure in chamber 56 in the locking device 26 will also be vented to atmosphere via passage 59, annular groove 85 in slide valve 78, and vent passage 97, with the result that spring 66 will urge piston 54 upwardly for carrying dog 63 of rod 60 into lateral proximity with the right-hand radial surface of collar 65 for locking rod 32 in empty position.

Moreover, with slide valve 78 in cut-off position, fluid under pressure will be released from chamber 17 of strut device 6 and chamber 52 of device 28 to atmosphere via conduit 53, and the annular groove 83 and restricted passage 84 and annular groove 85 in the slide valve 78 and the vent passage 97; such release of fluid under pressure being at a restricted rate, as controlled by passage 84, for assuring that, with the vehicle empty, the pressure of fluid in chamber 52 acting on empty piston 51 will be sufficient to maintain rod 32 in empty position until the locking device 26 functions to lock said rod 32 in said position, in the manner above described. While not important in the case of an empty vehicle, the restricted rate of release of fluid under pressure from chamber 17 of the strut device 6, via the communication just described, is important in the case of partially and fully loaded vehicles, for reasons to be explained subsequently. When the effect of fluid pressure in chamber 17 acting on piston 16 is overcome by the force of spring 22, said piston will be returned to normal position for carrying rod 21 out of contact with the unsprung portion 14 so as to prevent binding between said rod and unsprung portion during transit.

The variable load braking apparatus is now adjusted for braking an empty vehicle.

*Application of the brakes on an empty vehicle*

When it is desired to effect an application of the brakes, the brake pipe pressure is reduced in the usual manner for causing the brake controlling valve device 1 to supply fluid under pressure via conduit 3 to the main chamber 8 of the brake cylinder device 4, for thereby causing piston 7 to move against opposition of spring 9 for rapidly taking up slack in the brake rigging and thereby initiating the brake application.

It will be noted that during this movement of piston 7, the compensating chamber 12 will be desirably maintained open to atmosphere via conduit 127 and atmospheric chamber 124 in the atmospheric valve device 28 by virtue of the action of spring 123 on spool valve 120 in maintaining said valve in normal position against the opposing effect of fluid pressure in chamber 122, which is constantly open to the main chamber 8; and device 28 is therefore operative to not only prevent fluid pressure in the compensating chamber 12 which would oppose and possibly prevent outward movement of piston 7, but also is operative to desirably postpone supply of fluid under pressure to the compensating chamber so that slack will be taken up promptly even in the case of a light service application of the brakes.

After the slack has thus been taken up in the brake rigging, the pressure of fluid in passage 102, and hence in chamber 122, will continue to increase and cause spool valve 120 to move against the opposing force of spring 123 to its supply position, in which the annular groove 126 establishes fluid pressure communication between passage 104 and conduit 127, so that pressure of fluid in the compensating chamber 12 of brake cylinder device 4 may be controlled according to pressure in passage 104, the latter pressure being, in turn, controlled by the load condition of the vehicle, as will be shown presently.

Some of the fluid under pressure supplied, in the manner already described, to passage 102 will flow to chamber 112 at one side of empty check valve 100 in the fluid pressure control device 29; but the spring 115 will maintain said check valve seated until the pressure of fluid in main chamber 8 of the brake cylinder device 4 and hence in chamber 112 has attained the aforementioned preselected value; whereupon said check valve will be unseated for enabling fluid under pressure in pipe 3 to flow to chamber 113 and thence via the passage 114, annular chamber 117 in bore 48, and passage 104 to annular groove 126 in spool valve 120, whence it will flow, upon substantially simultaneous movement of said spool valve to charging position through conduit 127 to the compensating chamber 12 of the brake cylinder device 4.

Fluid under pressure thus supplied to the compensating chamber 12 will act on piston 7 in opposition to the pressure of fluid in the main chamber 8 to provide a resultant braking force sufficient to brake an empty vehicle; and by maintaining a constant fluid pressure differential, assumed illustratively as 5 p. s. i., between the pressures in chambers 8, 12 there will be no temporary reduction in braking force upon supply of fluid under pressure to chamber 12 and, moreover, the piston 7 will be positively maintained in an application position, even in the case of a light service application of brakes.

During a brake application some of the fluid under pressure supplied to passage 102 will flow to chamber 101 for assisting spring 105 in maintaining the release check valve 98 seated against the opposing effect of increasing fluid pressure in passage 104 and also some of the fluid under pressure supplied to annular chamber 117 in bore 48 will flow through passage 109 to chamber 108 for assisting spring 110 in maintaining the partial load check valve 99 seated against the opposing effect of increasing fluid pressure in passage 102.

*Release of the brakes with the equipment conditioned for empty car operation*

When it is desired to effect a release of the brakes, the brake pipe pressure is increased in the usual manner, causing the brake controlling valve device 1 to release fluid under pressure from the pipe 3, and hence from the main chamber 8 of the brake cylinder device 4 to the atmosphere. Since fluid under pressure will thus be released from chamber 101, the release check valve 98 will be unseated by preponderant pressure of fluid in chamber 103 for thereby releasing fluid under pressure from the compensating chamber 12 of brake cylinder device 4 to atmosphere via conduit 127, annular groove 126 in slide valve 120, passage 104, chamber 103, and past the now unseated check valve 98.

When the pressure in passage 102 and hence in chamber 122 of device 28 is reduced to the aforementioned chosen value of approximately 5 p. s. i., the spool valve 120 will be moved to normal position by the preponderating effect of spring 123 for thereby opening conduit 127 directly to atmospheric chamber 124 for positively assuring that the compensating chamber 12 of the brake cylinder device 4 will be maintained vented to atmosphere, during the final phase of a brake release, so as to assure that the piston 7 will positively move to brake release position. It will thus be noted that atmospheric valve device 28 operates to prevent a partial vacuum from being developed in chamber 12 which would tend to resist movement of piston 7 to brake release position, for such vacuum could not be released by the release check valve 98.

*Automatic changeover operation of the equipment of a partially loaded vehicle*

Assume now that with the brakes on the vehicle released and the vehicle separated from the train and the brake pipe 2 is at atmospheric pressure, lading is placed on the body of the vehicle. Under the influence of such additional weight, the vehicle body and consequently the sprung portion 13 will move downwardly relative to the unsprung portion 14 by reason of the usual truck springs (not shown) yielding to the additional weight; and thus the strut device 6 will be moved downwardly a greater distance away from the unsprung portion 14 than was described for an empty vehicle.

Now when the vehicle is connected in a train and the brake pipe 2 is charged with fluid under pressure in the usual manner, the cut-off valve device 27 and locking device 26 will function, as previously described for an empty vehicle, to supply fluid under pressure to conduit 53, at which time the dog 63 will be disengaged from the collar 65 on rod 32.

Fluid under pressure thus supplied to conduit 53 will flow to the chamber 52 in the load adjustable control device 28 and will act on empty piston 51 of rod 32 for urging said rod in a left-hand direction, as viewed in the drawing. At the same time, some of the fluid under pressure supplied to conduit 53 will flow therethrough to chamber 17 of strut device 6, causing piston 16 to move upwardly, against the opposing force of spring 22, until the end of rod 21 contacts unsprung portion 14; the travel of said piston being sufficient, when the vehicle is partially loaded, to uncover casing port 23 to chamber 17 while casing port 24 will continue to be open to the atmospheric chamber 19, as hereinbefore described. Hence, fluid under pressure will flow, via chamber 17, port 23, and conduit 36 into chamber 34 in the load compensating device 25, for causing the piston 30 to move against opposition of spring 44 and the pressure of fluid acting on empty piston valve 51 and thus, through the medium of rod 37, piston 31 and rod 45, shift the rod 32 until piston 30 contacts the casing partition 38; at which time the rod 32 will be disposed in its partial load positon, in which annular chamber 119 registers with passage 114 and annular chamber 117 registers with passages 104, 109 and the annular space between the collars 64, 65 is aligned with axis of stem 60 of locking device 26. The device 26 will thereafter operate, in the same manner as previously described for an empty vehicle, to lock the rod 32 in partial load position by advancing the dog 63 of stem 60 into the annular space between collars 64, 65.

The cut-off valve device 27 in the load compensating valve device 5 will function, as above described, to exhaust fluid under pressure from the locking device 26, from the chamber 52 in the load adjustable control device 28, and from the chamber 17 in the strut device. Now when the piston 16 of strut device 6 is returned to its normal position, fluid under pressure in chamber 34 of the load adjusting control device 25 will flow to atmosphere through passage 36, port 23 and atmospheric chamber 19 of strut device 6 for causing pistons 30, 31 to be returned to their respective normal positions by action of spring 44.

The brake apparatus of the partially loaded vehicle is now conditioned for a brake application.

*Application of the brakes on a partially loaded vehicle*

When an application of the brakes is effected on a partially loaded vehicle by a reduction in brake pipe pressure, the operation of the brake controlling valve 1 will be identical with that described for an empty vehicle. From this it will be understood that fluid under pressure will flow through pipe 3 to the main chamber 8 of the brake cylinder device 4 causing movement of piston 7 for rapidly taking up the slack in the brake rigging while the compensating chamber 12 is maintained open to atmosphere by operation of the atmospheric valve device 28 in the same manner as described for an empty vehicle.

At the same time that fluid under pressure is flowing to the main chamber 8, fluid under pressure will also flow from pipe 3 through passage 102 to chamber 107. When the pressure in chamber 107 exceeds the aforementioned pre-selected higher value, assumed illustratively as 15 p. s. i., partial load check valve 99 will be unseated against resistance of spring 110, causing fluid under pressure to flow via chamber 107 and past said valve to chamber 108 and thence via the passage 109, annular chamber 117, passage 104, annular groove 126 in spool valve 120, and conduit 127 to the compensating chamber 12 of the brake cylinder device 4, for it will be noted that the spool valve 120 will have previously been moved to charging position when pressure in pipe 3 attained the exemplary value of 5 p. s. i., as will be understood from previous description.

Thus, the partial load check valve 99, once unseated, will function to maintain a fluid pressure differential of approximately 15 p. s. i. between the main chamber 8 and the compensating chamber 12 of the brake cylinder device 4, unaffected by earlier unseating of the empty check valve 100, because passage 114 is now isolated from passage 104 and hence fluid under pressure flowing past the unseated valve 100 will merely be trapped in the annular chamber 119 in rod 32.

Release of an application of the brakes on a partially loaded vehicle

When it is desired to effect a release of the brakes on a partially loaded vehicle, brake pipe pressure is increased in the usual manner for causing operation of the brake controlling valve device 1 to connect pipe 3 to atmosphere; whereupon the main chamber 8 of brake cylinder device 4 will be vented, while at the same time the release check valve 98 and then the atmospheric valve device 28 will operate successively to fully release fluid under pressure from the compensating chamber 12, in the manner already described.

Initial charging, application and release of brakes—fully loaded vehicle

During initial charging of a fully loaded vehicle, the piston 16 of strut device 6 will travel upwardly a maximum distance in order to carry stem 21 into contact with unsprung portion 14. During such travel piston 16 will successively uncover ports 23 and port 24 to chamber 17, thereby causing fluid under pressure from conduit 53 to flow via chamber 17 and the respective ports 23, 24 to the corresponding chambers 34, 39 of load adjusting device 25. Since the chamber 39 is open to chamber 35, partial load piston 30 will remain stationary due to the equality of opposing pressures on its respective faces; however, the pressure of fluid in chamber 39 will be effective to cause piston 31 to move against resistance of spring 44 and thus move rod 32 against the effect of fluid pressure in chamber 52 acting on empty piston 51, until such movement is stopped by the engagement of piston 51 with the casing adjacent chamber 52. At this time, rod 32 will be in its full load position in which the annular chamber 119 registers with passages 109, 114 and annular chamber 117 registers with passage 104 and atmospheric passage 118. The locking device 26 will thereafter operate to advance the dog 63 of stem 60 to a position in which it is adjacent the left-hand lateral surface of collar 64, for thereby locking rod 32 in full load position.

Now during a brake application fluid under pressure will flow from brake controlling valve device 1 through pipe 3 in the usual manner to main chamber 8 of the brake cylinder device 4 for rapidly taking up slack in the brake rigging, while the compensating chamber 12 will be maintained open to atmosphere by previously described operation of the atmospheric valve device 28, for reasons hereinbefore explained. With rod 32 locked in full load position, however, it will be noted that when the spool valve 120 of device 28 is moved to supply position, the conduit 127 and hence compensating chamber 12 will nevertheless be maintained open to atmosphere by way of the annular groove 126 in said spool valve, passage 104, annular chamber 117 and atmospheric passage 118; and fluid under pressure supplied to the passage 114 by unseating of empty check valve 100 will assist spring 110 in maintaining partial load check valve 99 seated and will be trapped in annular chamber 119. Thus, when the vehicle is fully loaded, the compensating chamber 12 will be maintained open to atmosphere throughout a brake application for assuring a maximum braking force corresponding to preselected pressure of fluid in the main chamber 8. During brake release, the release check valve 98 will remain seated, and the piston 51 and then the atmospheric valve device 28 will operate successively to maintain the compensating chamber 12 open to atmosphere for thereby assuring return of piston 7 of the brake cylinder device 4 to brake release position, as will be understood from previous description.

Operation of cut-off valve device during emergency application and release of brakes under all load conditions If an emergency application of brakes is effected, then irrespective of the load condition of the vehicle, the brake pipe pressure will of course be reduced well below the preselected value, assumed illustratively as thirty-five p. s. i., at which the slide valve 78 of cut-off valve device 27 moves to cut-off position. Thus, during the emergency application, fluid under pressure will be released from chamber 80 to the brake pipe 2 via slide valve passage 81 at the rate controlled by the restricted passage 82, with the result that spring 93, acting through the medium of follower 94 and diaphragm 86, will shift the slide valve 78 to cut-in position. During subsequent charging of the brake pipe 2 for releasing the emergency application, fluid under pressure will flow from the brake pipe 2 at the rate controlled by restricted passage 82 to the passage 81 and hence to chamber 80; whereupon the cut-off valve device 27 will operate in the same manner as previously described in connection with initial charging for causing remeasurement of the load condition of the vehicle following which said slide valve will be returned to cut-off position by effect of increasing brake pipe pressure.

Having now described the invention, what I claim as new and desire to secure by Letters Patent, is:

1. In a variable load brake apparatus for a vehicle, in combination, a brake cylinder device comprising a casing having a piston therein dividing said casing into a main pressure chamber at one side of said piston and a compensating chamber at the opposite side and operative to provide a braking force on said vehicle equal to the difference in effects of fluid pressures in said chambers on said piston, brake controlling valve means operative to supply fluid under pressure to and release fluid under pressure from said main chamber, valve means subject opposingly to fluid pressure in said main chamber and to action of bias means and operative to open said compensating chamber selectively to atmosphere or to a supply passage according to whether fluid pressure in said main chamber is respectively less than or greater than a chosen value as determined by the effect of said bias means, fluid pressure control valve means comprising first valve means subject opposingly to pressure of fluid in said main chamber and action of a first spring and operative only when main chamber pressure exceeds a predetermined value to supply fluid under pressure to a first passage at a pressure less than that in said main chamber by said preselected value and further comprising second valve means subject opposingly to pressure of fluid in said main chamber and action of a second spring and operative only when main chamber pressure exceeds a predetermined higher value to supply fluid under pressure to a second passage at a pressure less than that in said main chamber by said preselected higher value, and a load adjustable control device comprising means controlled by the load condition of said vehicle and having an empty position for opening said first passage to said fluid pressure supply passage, and having a partial load position for closing off said first passage from said supply passage while opening the latter to said second passage, and also having a full load position for closing off said first and second passages from said supply passage and opening the latter to atmosphere.

2. In a variable load brake apparatus for a vehicle, in combination, a brake cylinder device comprising a casing having a piston therein dividing said casing into a main pressure chamber at one side of said piston and a compensating chamber at the opposite side and operative to provide a braking force on said vehicle equal to the difference in effects of fluid pressures in said chambers on said piston, and brake controlling valve means operative to supply fluid under pressure to and release of fluid under pressure from said main chamber, a load compensating device comprising first valve means operative to maintain said compensating chamber opened to atmosphere until fluid pressure in said main chamber has attained a chosen value and then operative to close said compensating chamber from atmosphere and open the latter chamber to a supply passage, a first check valve normally seated for preventing communication between said main chamber and a first passage and adapted to be unseated as main chamber pressure increases above a low value for thereafter maintaining a relatively low differential in fluid pressures between said main chamber and first passage, a second check valve normally seated for preventing communication between said main chamber and a second passage and adapted to be unseated as main chamber pressure increases above a higher value for thereafter maintaining a relatively higher differential in fluid pressures between said main chamber and said second passage, and means controlled according to the load condition of the vehicle and having an empty position for opening said first passage to said fluid pressure supply passage, and having a partial load position for closing off said first passage from said supply passage while opening the latter to said second passage, and also having a full load position for closing off said first and second passages from said supply passage and opening the latter to atmosphere.

References Cited in the file of this patent

UNITED STATES PATENTS

| | | |
|---|---|---|
| 2,482,246 | Cook et al. | Sept. 20, 1949 |
| 2,517,885 | Klein | Aug. 8, 1950 |
| 2,690,932 | Thomas | Oct. 5, 1954 |